E. KLAHN.
GYROSCOPE.
APPLICATION FILED AUG. 3, 1914.
1,309,636.
Patented July 15, 1919.
2 SHEETS—SHEET 2.
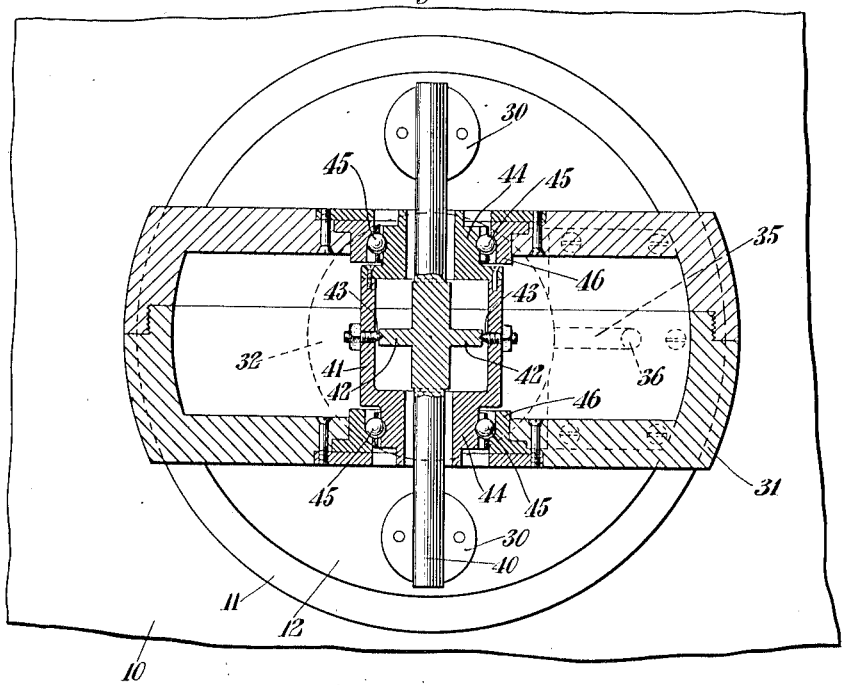
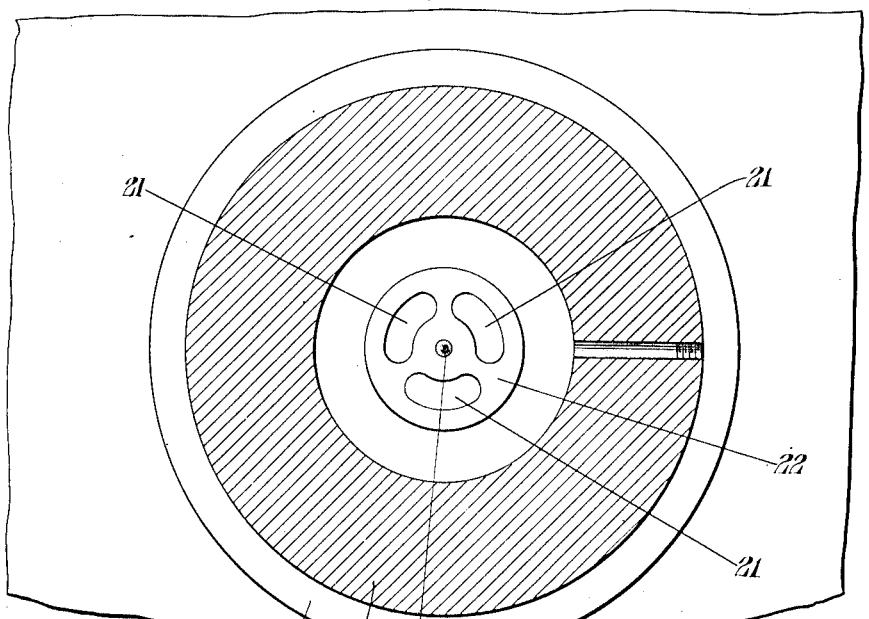
Witnesses:
John E. Prager
A. Worden Gibbs
Inventor
Emil Klahn
By his Attorney

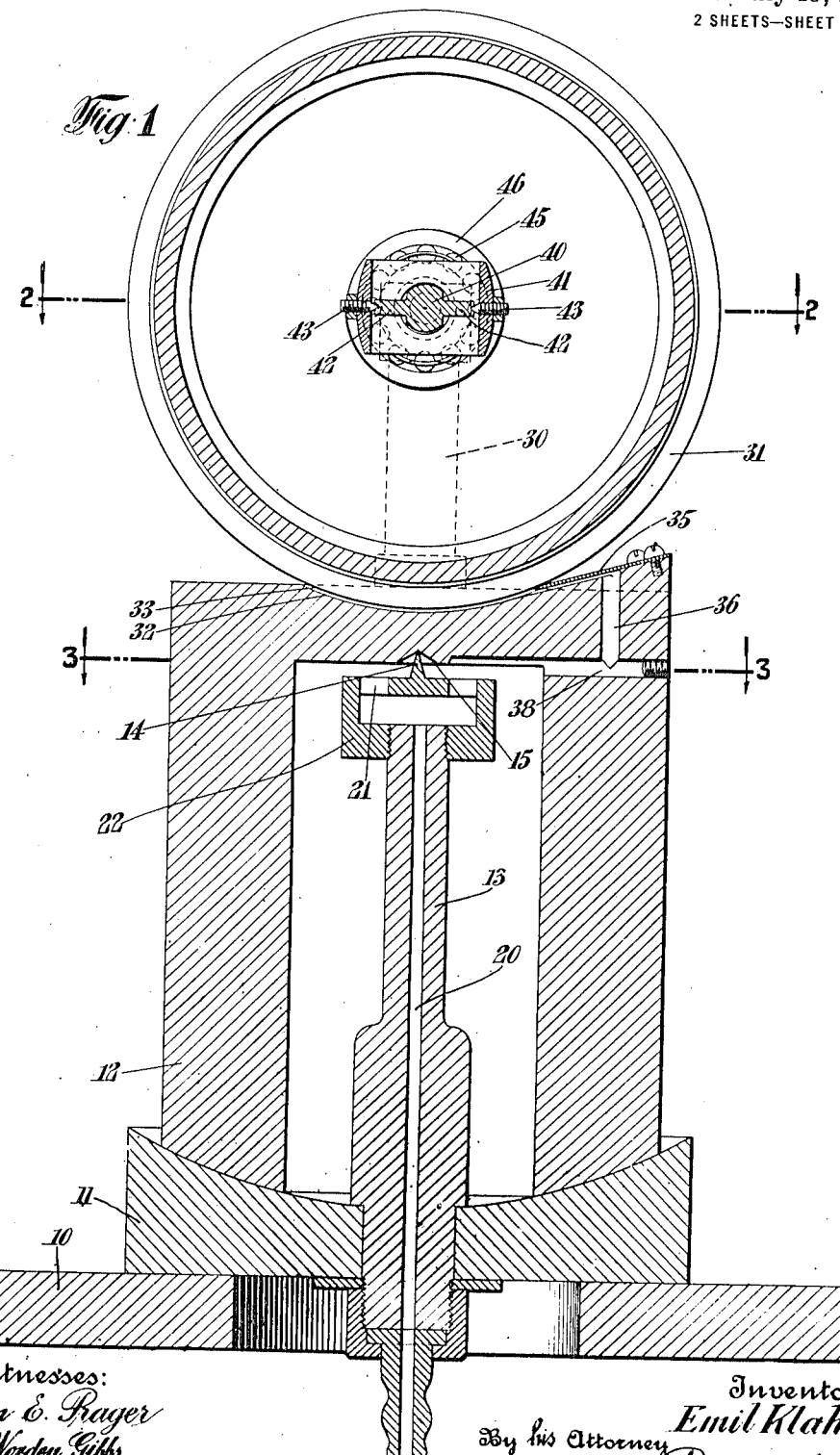

UNITED STATES PATENT OFFICE.

EMIL KLAHN, OF NEW VERNON, NEW JERSEY.

GYROSCOPE.

1,309,636.  Specification of Letters Patent.  Patented July 15, 1919.

Application filed August 3, 1914. Serial No. 854,863.

*To all whom it may concern:*

Be it known that I, EMIL KLAHN, a citizen of the United States, and a resident of New Vernon, in the county of Morris and State of New Jersey, have invented certain new and useful Improvements in Gyroscopes, of which the following is a specification.

The invention relates to gyroscopes, and it has for its object to simplify the construction of the same and the manner of effecting rotation of its spinning mass, as well as to afford a novel mounting for the latter and a novel mounting for obtaining freedom of rotation of the gyroscope about a vertical axis. A further object of the invention is to obviate pendulous motions of the entire gyroscope apparatus.

The nature of the invention will be best understood when described in connection with the accompanying drawings, in which—

Figure 1 is a vertical section through the apparatus.

Figs. 2 and 3 are horizontal sections taken respectively on the lines 2—2 and 3—3, Fig. 1.

Similar characters of reference designate corresponding parts throughout the several views.

Referring to the drawings, 10 designates a supporting base for the apparatus and which base may be hung in gimbal supports (not shown) or be otherwise suitably sustained. The base 10 is provided with a spherically dished portion 11 which is adapted to partly sustain, when the gyroscope is not in operation, a hollow cylinder 12, the under surface of which is similarly curved. Under certain conditions, hereinafter more fully set forth, the said cylinder 12 may rotate freely about its longitudinal axis and, furthermore, relative motion between the support 11 and cylinder 12 will be possible. Cylinder 12 is adapted, also, to be supported, preferably above its center of gravity, upon a stem 13 fixedly secured to the base 10 and extending centrally through the interior of the said cylinder. At its upper end, stem 13 is provided with a cone pivot 14 fitting within a guiding recess 15 of the inner surface of the cylinder. When free from said supports, cylinder 12 may rotate about its longitudinal axis and which passes substantially through the pivot 14, the said axis constituting the vertical axis of the gyroscope. To effect this freedom from its supports, the said cylinder 12 is adapted to be sustained by fluid (air) under the required pressure and conducted into the interior of the cylinder from a suitable supply (not shown) through a duct 20 of stem 13 and through openings 21 in a cap 22 secured to the upper end of said stem and which cap carries the pivot 14. When thus sustained, the said cylinder is free to rotate not only about a vertical axis as aforesaid but may oscillate about a horizontal axis.

The cylinder 12 carries at its top, as by means of suitable standards 30 and other mechanism hereinafter more fully set forth, a hollow rotatable or spinning mass 31 which is in the form of a sphere or a portion thereof and constructed in separable halves. The periphery of said mass is perfectly smooth and is adapted to run in a corresponding spherical cavity 32 of the upper portion of said cylinder. The extent of said cavity surface may be varied to suit the different applications of the apparatus, the width of the same, however, being preferably less than the width of the rotatable mass 31. The said mass is so mounted with respect to the said cavity, moreover, as to leave a shallow passage-way 33 between its periphery and the surface of said cavity, and the two said surfaces are mounted concentrically, the radius of curvature of the latter being, therefore, slightly greater than that of the former—the exact difference for best results being determined by trial and computation. The fluid to effect the rotation of mass 31 is arranged to be directed into the passage-way 33 through a suitable nozzle 35, preferably flat, and which communicates with the interior of cylinder 12 through a duct 36, the said nozzle being directed substantially at a tangent to the surface of cavity 32 and symmetrically disposed with respect to the plane of the equator of the said rotating mass. A stream of fluid is delivered thereby into the passageway 33 in the nature of a band and of which there will not be an appreciable lateral flaring as it passes therethrough, imparting its velocity to the mass 31 and, also, counteracting the weight of said mass relatively to the cylinder. The spinning mass, therefore, floats substantially free in space above the cylinder which latter, moreover, is similarly supported as, aforesaid, with respect to the base 10.

To guide the said mass and still retain the necessary, though slight, degree of freedom of oscillation about a horizontal axis perpendicular to the axis of rotation of the spinning mass 31, the latter is mounted upon the standards 30 in the following manner. A shaft 40 rests upon the said standards 30, and about the same and within the interior of the said mass is mounted a frame or cradle 41 which is adapted to oscillate about a horizontal axis perpendicular to the shaft 40. For this purpose, trunnions 42 extend outwardly from said shaft at right angles thereto to meet suitable pivots 43 extending inwardly from the sides of the said frame. To the frame 41 at each end thereof and having sufficient opening therethrough to permit the required oscillation of the frame 41 upon shaft 40 are attached ball retaining members 44 carrying sets of balls 45. Upon these balls are adapted to run respective annular bearing members 46 which are secured to the respective sides of the spinning mass 30. The spinning mass may thus rotate freely about a horizontal axis, represented by the shaft 40, upon the balls 45; and may rock as a whole with the frame 41 about a horizontal axis perpendicular thereto and represented by the trunnions 42. It is to be noted, furthermore, that the mounting hereinbefore described affords a means for insuring a perfect lateral balance of the spinning mass. The said spinning mass may, therefore, with great nicety be supported at its center of gravity. In any case, in view of the fact that the mass rotates substantially freely in space, it will find its own center of gravity.

Three degrees of freedom of rotation are thus insured for the gyroscope by the novel mountings hereinbefore described; and, moreover, an extremely simple apparatus is obtained and of which practically the entire mechanism is substantially inclosed. Moreover, by the fluid suspension of the cylinder 12 and of the spinning mass 31, the entire apparatus is substantially floating in space and is not susceptible to pendulous effects originating in the gimbal mountings or to other motions of the support 10. Furthermore, any possible pendulous motions of the cylinder 12 itself would be without effect upon the spinning mass 31 in view of its novel suspension. Barring purely accidental disturbances, therefore, the said cylinder is continually maintained in the plumb line.

I claim:—

1. A gyroscope, comprising a fluid supported mass free to rotate about two mutually perpendicular horizontal axes, and a fluid supported carrying member therefor.

2. A gyroscope, comprising a fluid supported mass free to rotate about two mutually perpendicular horizontal axes, and a fluid supported carrying member therefor free to rotate about a vertical axis.

3. A gyroscope, comprising an air supported mass free to rotate about two mutually perpendicular horizontal axes, and an air supported carrying member therefor free to rotate about a vertical axis.

4. A gyroscope, comprising a mass free to rotate about two mutually perpendicular horizontal axes, means to direct a stream of fluid thereto to effect the spinning of the same, and a fluid supported carrying member for said rotatable mass.

5. A gyroscope, comprising a rotatable mass, a rotatable support therefor, and means to direct a stream of fluid to said support and to said rotatable mass to sustain the former and effect the spinning of the latter.

6. A gyroscope, comprising a rotatable mass, a rotatable, hollow, fluid sustained support therefor, a nozzle to direct fluid for driving said rotatable mass, said nozzle being carried by said support and communicating with the interior thereof, and means to admit fluid to the interior of said support.

7. A gyroscope, comprising a mass free to rotate about two mutually perpendicular horizontal axes, an air supported carrying member therefor free to rotate about a vertical axis, and means to direct a stream of air to said rotatable mass to effect the spinning thereof and to support the same.

8. A gyroscope, comprising a mass free to rotate about two mutually perpendicular horizontal axes, an air supported carrying member therefor free to rotate about a vertical axis, and means to direct a stream of air to independently sustain said rotatable mass and said support therefor.

9. A gyroscope, comprising a mass free to rotate about two mutually perpendicular horizontal axes, a support therefor rotatable about a vertical axis, and means to direct a stream of air to said support and to said rotatable mass, to sustain both and to effect the spinning of the latter.

10. A gyroscope, comprising a rotatable mass, a hollow, rotatable support therefor adapted to receive a fluid and to be supported thereby, a frame, and a central pivotal carrier mounted on said frame for said support.

11. A gyroscope, comprising a rotatable mass, a rotatable, hollow, fluid sustained support terminating in a spherical surface at the bottom, a frame provided with a spherical cavity to receive the lower end of said rotatable support, a stem carried by said frame, extending into said support and terminating in a suitable pivot for said support.

12. A gyroscope, comprising a rotatable mass, a rotatable, hollow, fluid sustained support therefor, terminating in a spherical surface at the bottom and having a suitable recess in its internal upper surface, a frame provided with a spherical cavity to receive the lower end of said support, a stem carried by said frame, extending into said support and terminating in a suitable pivot adapted to coöperate with the said recess in the internal surface of the support.

13. A gyroscope, comprising a rotatable mass, a rotatable, hollow, fluid sustained support therefor, a frame, a hollow stem carried by said frame, extending into said support to admit fluid therein, said stem terminating in a suitable pivot for the said rotatable support.

14. A gyroscope, comprising a rotatable mass, a rotatable, hollow, fluid sustained support therefor, a nozzle carried by said support and communicating with the interior thereof to direct a stream of fluid to said rotatable mass to effect the rotation of the same, and means communicating with the interior of said support to admit fluid.

15. A gyroscope, comprising a rotatable mass having a smooth peripheral surface, a rotatable support coöperating therewith to provide a passage-way, and means carried by said support to direct a stream of fluid into said passage-way to effect the spinning of said mass.

16. A gyroscope, comprising a rotatable mass consisting of a portion of a sphere, a rotatable support therefor having a spherical cavity, concentric with said mass but of greater radius of curvature, to provide a passage-way, and a nozzle carried by said support to direct a stream of fluid into said passage-way to effect the spinning of said mass.

17. A gyroscope, comprising a rotatable mass consisting of a portion of a sphere, a rotatable, hollow support therefor having a spherical cavity, concentric with said mass but of greater radius of curvature, to provide a passage-way, a nozzle carried by said support and communicating with its interior, to direct a stream of fluid into said passage-way to effect the spinning of said mass, and means to admit fluid to the interior of said support.

18. A gyroscope, comprising a mass free to rotate about two mutually perpendicular horizontal axes and having a smooth peripheral surface, a support therefor rotatable about a vertical axis and coöperating with said peripheral surface to provide a passage-way, and means carried by said support to direct a stream of fluid into said passage-way to effect the spinning of said mass.

19. A gyroscope, comprising a suitable support, a shaft carried by said support, a hollow member mounted to oscillate about an axis perpendicular to said shaft and adapted to receive a fluid to be supported thereby, and a hollow, rotatable mass carried by said member.

20. A gyroscope, comprising a hollow, rotatable mass, a support therefor, a shaft carried by said support and extending through said mass, a member mounted within said mass to oscillate about an axis perpendicular to said shaft, and means to rotatably mount said mass on said oscillatory member.

21. A gyroscope, comprising a hollow, rotatable mass, a support therefor, a shaft carried by said support and extending through said mass, a member mounted within said mass to oscillate about an axis perpendicular to said shaft, and suitable anti-friction members to rotatably mount said mass upon said oscillatory member.

22. A gyroscope, comprising a hollow, rotatable mass, a support therefor, a shaft carried by said support and extending through said mass, a member mounted within said mass about said shaft, trunnions extending from said shaft perpendicularly thereto and upon which said member is adapted to oscillate, and means to rotatably mount said mass on said oscillatory member.

23. A gyroscope, comprising a hollow, rotatable mass, a support therefor rotatable about a vertical axis, a shaft carried by said support and extending through said mass, a member mounted within said mass to oscillate about an axis perpendicular to said shaft, and suitable anti-friction members to rotatably mount said mass upon said oscillatory member.

24. A gyroscope, comprising a rotatable mass consisting of a portion of a hollow sphere, a hollow support therefor having a spherical cavity, concentric with said rotatable mass but of greater radius of curvature, to provide a passage-way, said support being rotatable about a vertical axis, a nozzle carried by said support and communicating with its interior to direct a stream of fluid into said passage-way to effect the spinning of said rotatable mass, means to admit fluid to the interior of said support, a shaft carried by said support and extending through said rotatable mass, a member mounted within said mass about said shaft, trunnions extending from said shaft perpendicularly thereto and upon which said member is adapted to oscillate, and means to rotatably mount said mass upon said oscillatory member.

Signed at New York, in the county of New York, and State of New York, this 31st day of July, A. D. 1914.

EMIL KLAHN.

Witnesses:
FRED'K F. SCHUETZ,
ALEXANDER S. CHESSIN.